Figure 11:
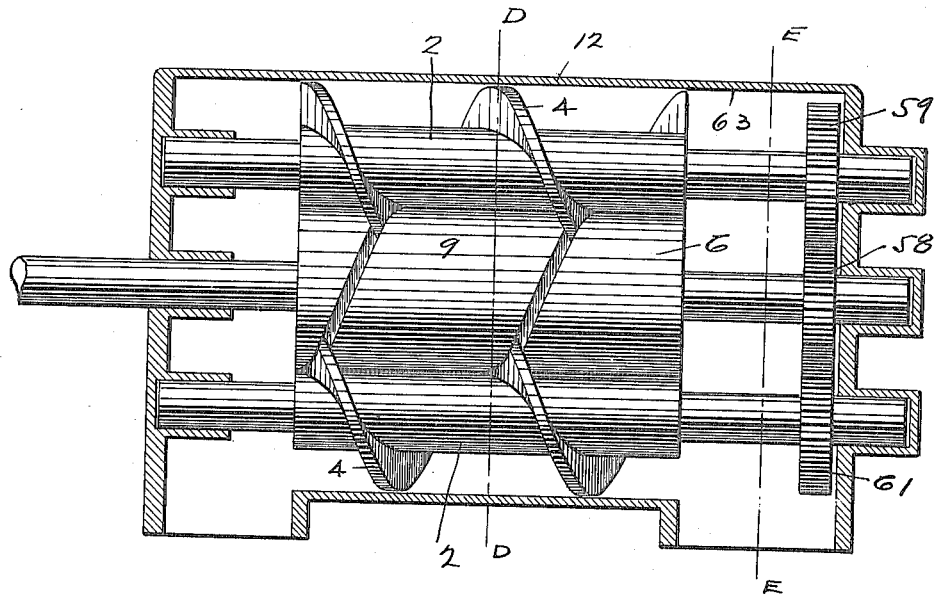

A. H. NEULAND.
DISPLACEMENT APPARATUS.
APPLICATION FILED APR. 29, 1913.
1,164,546.
Patented Dec. 14, 1915.
5 SHEETS—SHEET 1.
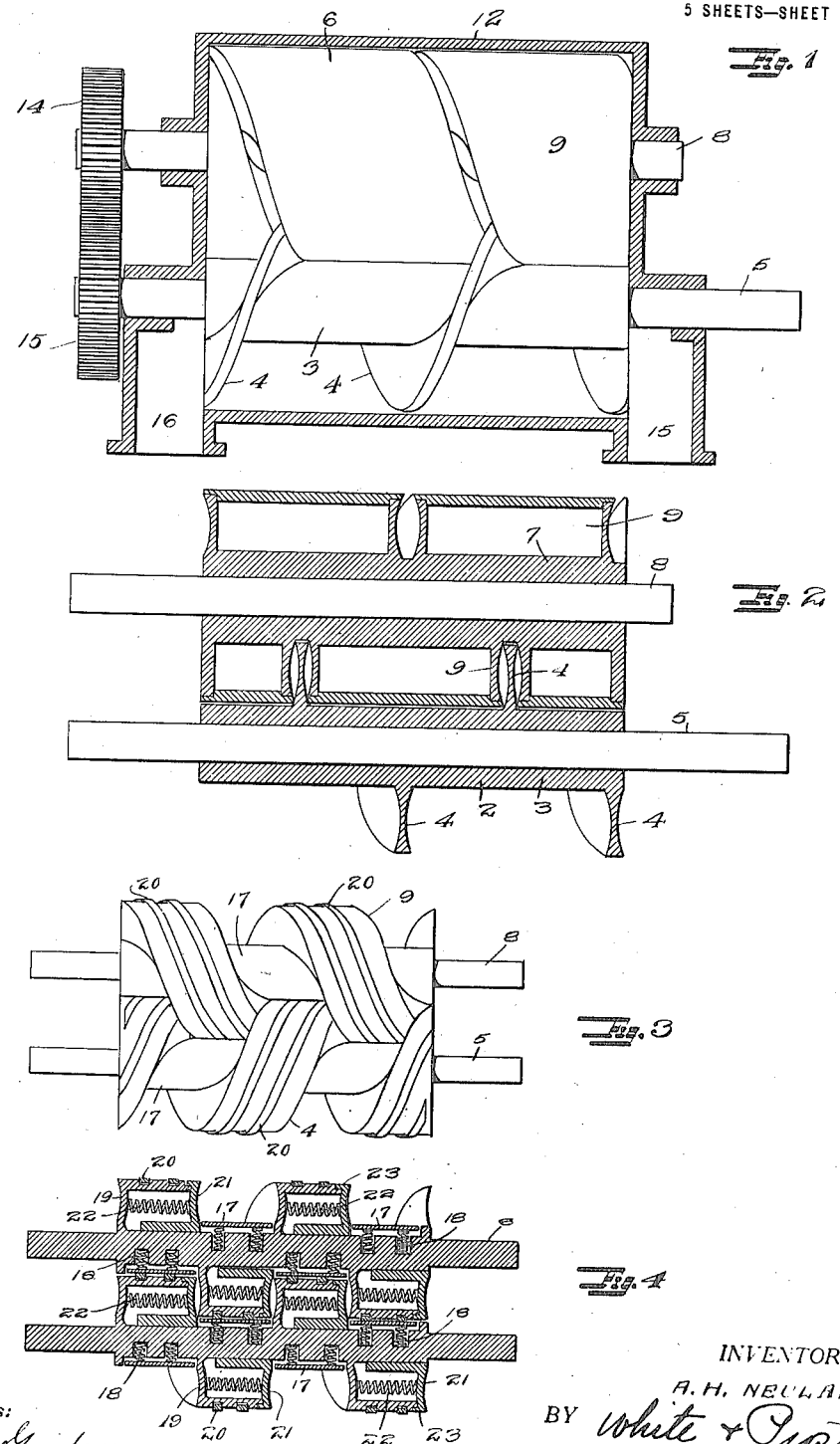
INVENTOR.
A. H. NEULAND
BY White & Prost
his ATTORNEYS.
Witness:
J. B. Gardner

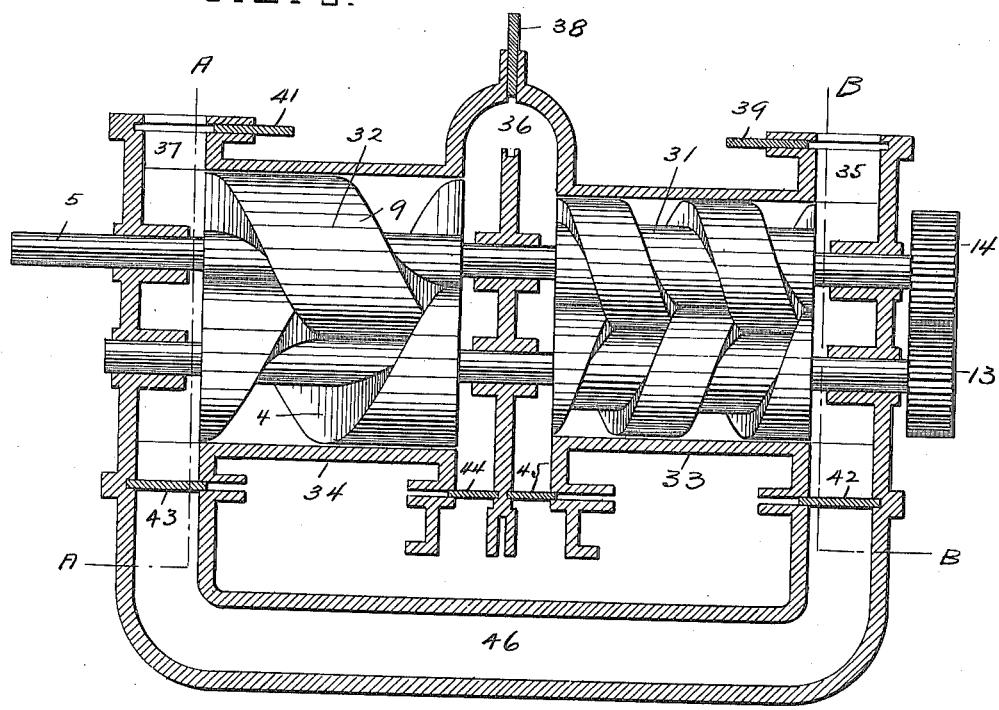
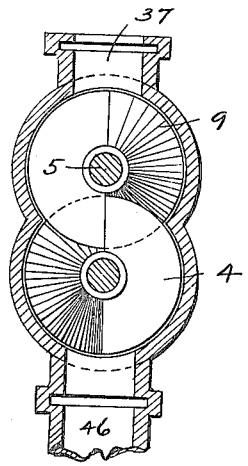
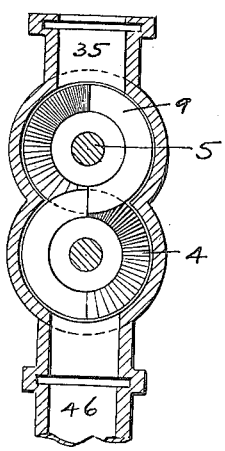

A. H. NEULAND.
DISPLACEMENT APPARATUS.
APPLICATION FILED APR. 29, 1913.
1,164,546.
Patented Dec. 14, 1915.
5 SHEETS—SHEET 3.
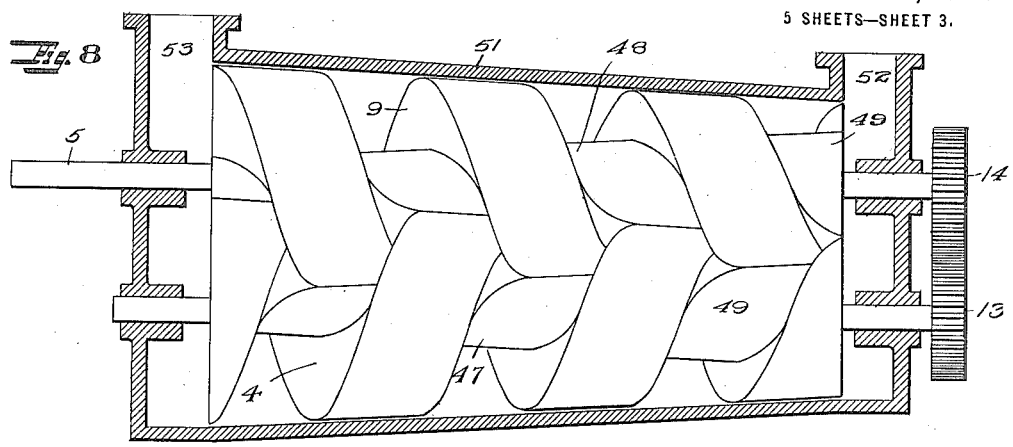
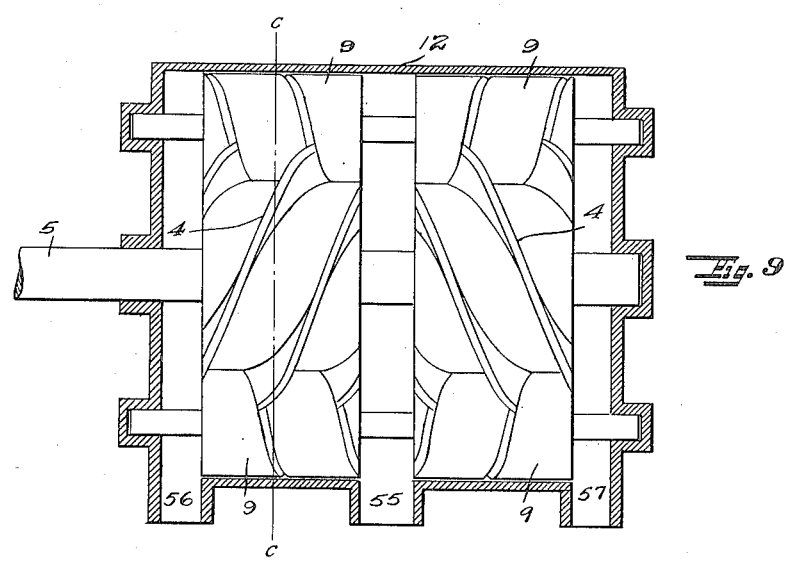
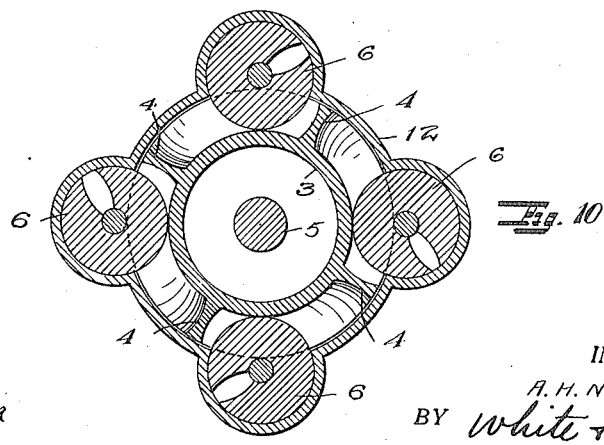
WITNESSES:
J. B. Gardner
INVENTOR.
A. H. NEULAND
BY White + Prost
his ATTORNEYS.

A. H. NEULAND.
DISPLACEMENT APPARATUS.
APPLICATION FILED APR. 29, 1913.

1,164,546.

Patented Dec. 14, 1915.
5 SHEETS—SHEET 4.

WITNESSES:
J. B. Gardner.
H. G. Prost.

INVENTOR.
A. H. NEULAND
BY Miller & White
HIS ATTORNEYS.

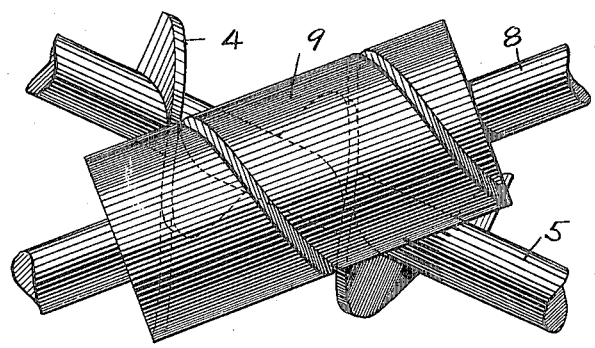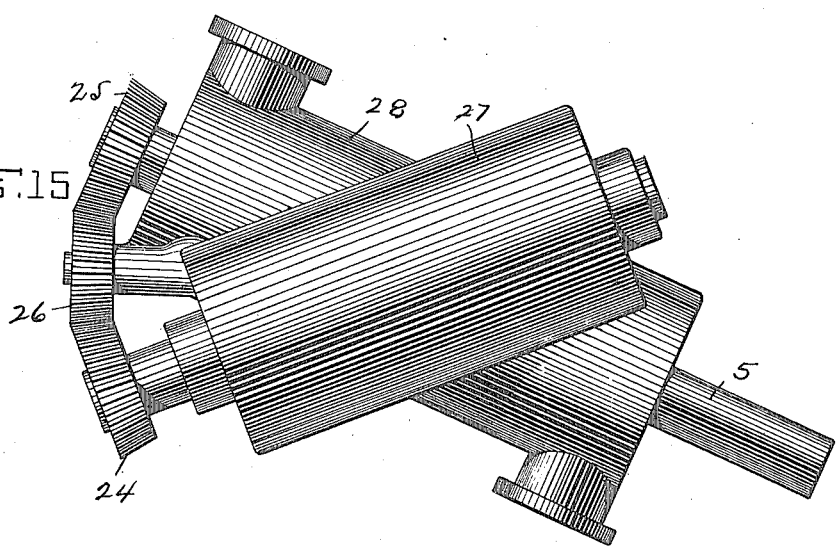

UNITED STATES PATENT OFFICE.

ALFONS H. NEULAND, OF SAN FRANCISCO, CALIFORNIA.

DISPLACEMENT APPARATUS.

1,164,546.	Specification of Letters Patent.	Patented Dec. 14, 1915.

Application filed April 29, 1913. Serial No. 764,350.

*To all whom it may concern:*

Be it known that I, ALFONS H. NEULAND, a subject of the Czar of Russia, and a resident of the city and county of San Francisco, State of California, have invented certain new and useful Displacement Apparatus, of which the following is a specification.

The invention relates to an apparatus for converting the energy of fluids or fluid bodies into mechanical energy and vice versa.

The object of the invention is to produce an apparatus for converting the energy of fluids into mechanical energy and vice versa.

Another object of the invention is to provide a compact and simple apparatus for converting the energy of fluids into mechanical energy and vice versa, which has great power capacity in proportion to its size.

Another object of the invention is to provide a displacement apparatus in which the displacement is continuous.

A further object of the invention is to provide continuous longitudinal displacement by means of rotary motion.

The invention possesses many other objects and advantageous features, which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description as I may adopt many variations within the scope of my invention as expressed in said claims.

Figure 12:
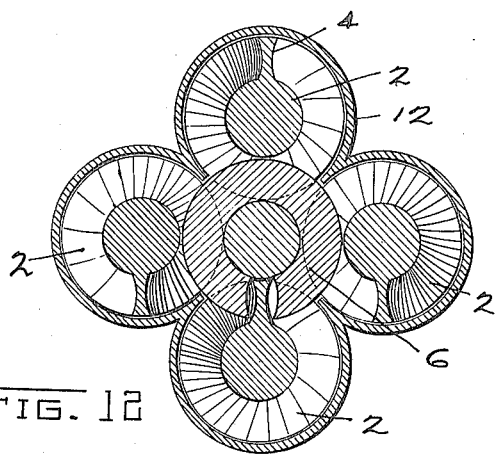
Figure 13:
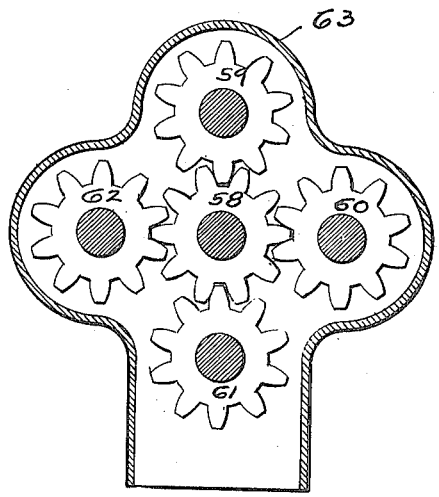

Referring to said drawings: Figure 1 is a vertical longitudinal section through one form of the apparatus of my invention, the piston and valve being shown in full. Fig. 2 is a longitudinal section of the piston and valve shown in Fig. 1. Fig. 3 is an elevation of another form of piston and valve showing packing rings. Fig. 4 is a longitudinal section of the piston and valve shown in Fig. 3. Fig. 5 is a vertical section through a two stage form of the apparatus. Fig. 6 is a vertical cross section taken on the line A—A Fig. 5. Fig. 7 is a vertical cross section taken on the line B—B Fig. 5. Fig. 8 is a longitudinal section through a modified form of the apparatus. Fig. 9 is a longitudinal section through a double form of the apparatus employing a plurality of pistons and valves. Fig. 10 is a cross section of the apparatus shown in Fig. 9 taken on line C—C. Fig. 11 is a longitudinal section through a modified form of the apparatus employing four pistons and one valve. Fig. 12 is a cross section through the apparatus shown in Fig. 11 taken on the line D—D. Fig. 13 is a cross section through the apparatus shown in Fig. 11 taken on the line E—E. Fig. 14 is a modified form of the piston and valve. Fig. 15 is an exterior view of an apparatus employing the valve and piston arrangement shown in Fig. 14.

By the expression "fluid" herein, I mean fluid in its broadest sense, as covering gases, vapors, liquids, or any substance which yields to any force that tends to change its form.

The apparatus of my invention is capable of numerous applications, as a converter of fluid energy into mechanical energy, as a converter of mechanical energy into fluid energy and as an energy absorption device. Among its many applications it may be employed as a hydraulic turbine, a steam turbine, a gas turbine, a pump, a propeller, an absorption dynamometer and a brake.

The apparatus comprises a rotating piston, which on account of its peculiar construction operates as a continuously longitudinally moving piston, a valve of the same characteristics associated therewith, and a cylinder inclosing said valve and piston. The apparatus may comprise one piston, and its associated valve may consist of one piston and several valves or may consist of one valve and several pistons.

The piston 2 preferably comprises a hollow shaft or core 3 having one or more helical ribs 4 thereon. The core 3 may be fixed on a shaft 5 as shown in Fig. 2 or the core and shaft may be formed integral as shown in Fig. 4. The valve 6 is similarly constructed in regard to the core 7 and shaft 8 and is provided with one or more helical ribs 9 of a width substantially equal to the distance between the successive turns of the rib or ribs 4 on the revolving piston 2. The height of the ribs 4 and 9 are equal, so that when the two parts are associated the outer faces of the ribs on one element contact with or lie in very close relation to the body or core 3 of the other element, thereby forming a tight joint between the two elements. The ribs on each element may be formed of substantially the same width as shown in Fig. 3, or the ribs on the piston may be formed narrow and those on the valve broad, as shown in Fig. 1.

The shafts 5 and 8 are preferably journaled in the cylindrical casing 12 which incloses the elements, and are provided on their ends with gears 13—14 so that the two parts rotate in unison. These gears cause the parts to rotate in synchronism, prevent any binding of the piston and valve, and prevent the excessive wear on the ribs which would occur in many cases should the valve be driven directly by the piston through the ribs. In instances when the pitch of the ribs on the piston or valve is small and the valve part acts solely as a valve, it is feasible to eliminate the gears.

The inner surface of the cylinder 12 corresponds to the surface described by the rotating valve and piston, or in other words, a surface formed by intersecting circular cylinders. The piston and valve have a snug sliding fit in the cylinder so that leakage between the ribs and the cylinder may be reduced to a minimum. The cylinder 12 is provided at opposite ends with passages 15—16 communicating with that part of the cylinder in which the piston is arranged, to allow the flow of fluid to and from the piston. Power is supplied to or taken off from the apparatus through the piston shaft.

When the construction illustrated in Figs. 1 and 2 is employed, that is, when the helical rib on the valve is made wider than the rib on the piston, I prefer to make the rib 9 hollow to reduce the weight of the valve. The sides of the ribs on both the valve and the piston are curved inward, so that the ribs are wider at the base and outer ends than they are at the center. This feature allows the rib on one element to enter and leave the groove formed between the two adjacent turns of the rib on the other element, and also insures a closed joint at these points.

The apparatus may be suitably packed to prevent leakage between the revolving elements and the cylinder, and between the revolving elements. One means of securing this result is shown in Figs. 3 and 4. In this construction the width of the ribs on the two elements is substantially the same, so that each element acts as both a piston and valve. Formed on the outer face of the ribs are grooves in which are arranged helical packing rings 20 which bear outward against the cylinder, completely closing the joint therebetween. Arranged in the grooves between the ribs are helical plates or strips 17 which are pressed outward by means of springs 18 seated in pockets formed in the bodies of the rotating elements. These helical strips 17 operate in conjunction with the packing rings 20 to completely seal the joint between the outer face of the rib on one element and the body of the other element. The joints between the side faces of the ribs on the two elements are also sealed by forming the ribs in two parts, movable with respect to each other. Each rib consists of a part 19 formed integral with the body of the element and forming one side and the outer face of the rib and a separately formed helical member 21 which forms the other side of the rib and is slidable longitudinally on the body of the element. Arranged between the fixed side and the movable side 21 are a plurality of springs 22 under compression which operate to press the movable side 21 of the rib on one member against the fixed side of the rib on the other member, thereby closing the joint between the two ribs. The helical strip 17 operates as a spacing means between the movable side of the rib and the fixed side of the adjacent turn of the same rib, thereby preventing the movable side from moving out of contact or engagement with the outer face of the rib. The movable side 21 is formed with a flange 23 at the outer edge which seats in a ledge in the outer face. By these means the apparatus is efficiently packed and the leakage is reduced to a minimum.

It is evident that as the valve and piston are revolved, in the constructions shown herein, that a succession of longitudinally moving closed pockets is produced, each pocket operating to displace the fluid contained therein from one end of the cylinder to the other, and since the pockets are closed at the receiving or intake end before they open at the discharge end, the fluid may be discharged at a high pressure. Consequently, if fluid under pressure is introduced at the intake end, the pressure causes the piston and valve to revolve to increase the size of the pocket and then to close it, forming immediately another pocket which is filled, thereby causing the revolution of the parts.

The apparatus may be constructed so that one pocket is formed immediately after its predecessor is closed, or so that one pocket opens when its predecessor is half full. In either case, the turning effect produced by the fluid under pressure is constant.

I find it preferable to employ a right and left hand helix for the valve and piston construction, although efficient results can also be obtained by the use of two right hand or two left hand helixes as shown in Figs 14 and 15. When the right and left hand helix construction is employed the valve and piston rotate in opposite directions and when two rights or two lefts are used the two rotatable elements rotate in the same direction. When the latter construction is employed, the axes of the two elements are preferably arranged at an angle to each other, and the shafts are preferably connected by means of the gears 24—25 and the idler gear 26. The cylindrical casing in this construction consists of two cylinders 27—28 intersecting each other at an angle.

In Fig. 5 I have shown a compound or two stage apparatus which is preferably used with an expansive fluid such as steam or gas. In this construction the width of the helical ribs in each valve and piston set is the same so that each rotating element acts both as a piston and as a valve for its associated element. When this construction is employed it is desirable to employ the gears 13—14 so that the power may be transferred to the drive shaft 5 by means other than the engagement of the ribs. In Fig. 5, there are two piston and valve sets, 31—32 inclosed in their respective cylinders 33—34. Conductors connected to the opposite ends of the cylinders are provided with valves so that the apparatus may be operated as a single or a double stage turbine or that the direction of rotation may be reversed. When operating as a double stage turbine, steam is admitted through the conductor 35 and passes through the set 31, expands into the chamber 36 passes through the larger set 32 and exhausts through conductor 37. By closing valves 38—39 and 41 and opening valves 42—43—44 and 45, steam may be introduced through the valve 45 into the first stage 31 through the conductor 46 and the second stage 32 and discharge through valve 44, thereby producing a reverse direction of rotation.

The construction shown in Fig. 8 is adapted to be employed with expansible or compressible fluids such as steam, gas or air, so that not only the pressure, but the expansive effect of the fluids may be utilized. The apparatus when driven by mechanical energy may be employed as a compressor or dynamometer, but since its chief value is as an expansion turbine, I shall so describe it herein. In this construction I have shown the helical ribs on both rotating elements 47—48 to be of substantially the same width, so that each element operates in itself as a continuous piston and as a valve for the other element. For this reason I shall term the elements 47—48 valve-pistons. The height of the helical rib on each valve-piston gradually increases from one end of the element to the other, and the diameter of the body portion 49 increases in the opposite direction in the same proportion, so that the outer face of each rib lies very close to the body of the other element at the points of engagement. The inclosing cylinder 51 is formed so that it lies in close contact with the outer faces of the ribs except at their intersecting or overlapping parts, thereby forming a tapered cylinder. The pockets inclosed by the cylinder and the rotating elements, therefore, gradually increase in volume from one end of the cylinder to the other, thereby allowing the compressed fluid to expand as it passes through the cylinder. The forward face of each pocket is of greater area than the rear face, causing a greater pressure to be exerted on the forward face than on the rear face, and this difference in pressure causes the rotation of the parts. The inclination of the enveloping surface of the ribs may be made as desired, so that any desired expansion may be obtained. The fluid under pressure is introduced into the small end of the cylinder through the port 52 and the spent fluid is exhausted through the port 53. By this construction the expansion as well as the pressure of the fluid may be utilized and the fluid may be discharged at atmospheric or a lower pressure.

In the structure shown in Figs. 9 and 10 I have shown a piston comprising a core 3 having four helical ribs 4 formed thereon coöperating with four valves 6, each valve having one helical rib 9 thereon. This arrangement allows of a small helical pitch of the ribs on the valves, so that they are readily rotated by contact with the ribs on the piston, and the gears connecting the piston shaft and valve shafts may be dispensed with. In this structure the fluid under pressure enters through the port 55, divides, part passing to the right and part to the left, and discharges through the ports 56—57.

In the structure shown in Figs. 11-12 and 13, I employ one valve 6 and four pistons 2, each piston and valve having one helical rib thereon. The cylinder is formed to accommodate this arrangement of the pistons and consists of four parallel intersecting circular cylinders. The valve shaft is provided with a gear 58 which meshes with gears 59—60—61—62 on the piston shafts, thereby transmitting the power from the piston shafts to the valve shaft and causing all of the shafts to rotate in synchronism. Power is supplied or taken off from the valve shaft, which projects from the casing. That part 63 of the casing which is beyond the pistons need not conform to the cylinder described by the rotating piston, and is preferably formed to facilitate the entrance or discharge of the fluid to the cylinders. This arrangement of pistons and valves allows of a greater capacity for a given size machine than the single valve and piston construction.

I claim:

1. A displacement apparatus comprising two helically ribbed rotatable elements in meshed engagement, a helical packing arranged in the outer face of each rib, and an open end cylinder surrounding said elements.

2. A displacement apparatus comprising two helically ribbed rotatable elements in meshed engagement, a helical packing strip arranged on each element at the base of the rib, and an open end cylinder surrounding said elements.

3. A displacement apparatus comprising two rotatable bodies, helical ribs on said bodies in meshed engagement, a helical packing strip arranged on each body between said ribs, means for pressing said strips outward, and an open end cylinder in engagement with the outer surfaces of said ribs.

4. A displacement apparatus comprising two rotatable bodies, helical ribs on said bodies in meshed engagement, a helical packing strip arranged on each body between the successive turns of said ribs adapted to be engaged by the outer face of the ribs on the other body, springs arranged in said bodies adapted to press said strips outward, and an open end cylinder in contact with the outer surfaces of said ribs.

5. In a displacement apparatus, a rotatable element, and a helical rib on said element formed in two parts movable longitudinally with respect to each other.

6. In a displacement apparatus, a rotatable element, a helical rib on said element formed in two parts movable longitudinally with respect to each other, and means for pressing said parts apart.

7. In a displacement apparatus, a rotatable element, a helical rib on said element formed in two parts movable longitudinally with respect to each other, means for pressing said parts apart, and means for limiting the relative movement of said parts.

8. In a displacement apparatus, a rotatable element, a helical rib on said element formed in two parts, one of said parts comprising one side and the outer face of the rib being formed integral with said element, the other part comprising the other side of said rib being formed separately and being movable with respect to said integral part, a plurality of springs arranged between said parts adapted to force them apart, and means for limiting the movement of the movable part with respect to the integral part.

9. A displacement apparatus comprising two parallel conical rotating elements, a helical rib of gradually increasing height on each of said elements in mesh with each other, gears connecting said elements, and a cylinder arranged in close engagement with the unmeshed outer surfaces of said ribs.

In testimony whereof, I have hereunto set my hand at San Francisco, California, this 24th day of April 1913.

ALFONS H. NEULAND.

In presence of—
  H. G. PROST,
  M. LE CONTE.